United States Patent [19]

Bastioli et al.

[11] Patent Number: 4,908,428
[45] Date of Patent: Mar. 13, 1990

[54] QUICK-CRYSTALLIZING POLYESTER COMPOSITION

[75] Inventors: Catia Bastioli; Vittorio Bellotti, both of Novara; Luciano Del Giudice, Milan, all of Italy

[73] Assignee: Montefibre S.p.A., Milan, Italy

[21] Appl. No.: 323,369

[22] Filed: Mar. 14, 1989

Related U.S. Application Data

[63] Continuation-in-part of Ser. No. 78,084, Jul. 27, 1987, abandoned.

[51] Int. Cl.⁴ .............................................. C08G 63/02
[52] U.S. Cl. .................................... 528/272; 528/274; 528/275; 528/287; 528/288; 528/290; 528/302; 528/305; 528/308.1; 525/416; 525/418; 525/419; 525/425; 525/439; 525/444; 524/327; 524/333; 524/341; 524/394
[58] Field of Search ............... 528/272, 274, 275, 287, 528/302, 305, 308.1, 288, 290; 525/416, 418, 419, 425, 439, 444; 524/327, 333, 341, 394

[56] References Cited

U.S. PATENT DOCUMENTS

| | | | |
|---|---|---|---|
| 3,516,957 | 6/1970 | Gray, Jr., et al. | 524/315 |
| 3,761,450 | 9/1973 | Herwig et al. | 525/437 |
| 4,212,791 | 7/1980 | Avery et al. | 524/539 |
| 4,425,470 | 1/1984 | Garcia | 525/444 |
| 4,451,606 | 5/1984 | Campbell | 524/445 |
| 4,668,732 | 5/1987 | Kono et al. | 524/497 |
| 4,670,498 | 6/1987 | Furusawa et al. | 524/381 |
| 4,687,795 | 8/1987 | Dunkle et al. | 523/436 |
| 4,699,942 | 10/1987 | Weaver et al. | 524/338 |
| 4,840,981 | 6/1989 | Hasuo et al. | 524/114 |

FOREIGN PATENT DOCUMENTS 2015014 9/1979 United Kingdom.

Primary Examiner—Morton Foelak
Assistant Examiner—S. R. Acquah
Attorney, Agent, or Firm—Stevens, Davis, Miller & Mosher

[57] ABSTRACT

Quick-crystallizing polyester compositions comprising a mixture consisting or consisting essentially of a polyester thermoplastic resin and of 0.1–10% by weight of a nucleant selected from polymeric-base salts, or mixtures of salts, of alkali metals or alkaline-earth metals of the formula:

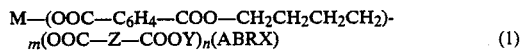

$$M\text{--}(OOC\text{--}C_6H_4\text{--}COO\text{--}CH_2CH_2CH_2CH_2)\text{-}_m(OOC\text{--}Z\text{--}COOY)_n(ABRX) \quad (1)$$

wherein
M is an alkali or alkaline-earth metal;
Y is a group —$CH_2CH_2$—, —$(CH_2)_4$— or —$CH_2CH_2OCH_2CH_2$—;
Z is a group —$C_6H_4$—, or a group —$(CH_2)_q$—, q being an integer from 7 to 10;
A is an anion selected from the group consisting of carboxylate, sulphonate, sulphinate, phosphonate, phosphinate;
B may be a single bond or a group selected from the group consisting of —CH=CH—, —$CH_2$—, —$CH_2CH_2$—;
R is an arylene radical containing from 1 to 3 aromatic rings or a heterocyclic ring;
X is a hydrogen atom or a group —COOM or —COO$(CH_2)_4$OH;
m is an integer from 5 to 20; and
n is an integer from 0 to 5, preferably from 1 to 3.

9 Claims, No Drawings

QUICK-CRYSTALLIZING POLYESTER COMPOSITION

This application is a continuation-in-part of U.S. Ser. No. 078,084, filed July 27, 1987, and now abandoned.

DESCRIPTION OF THE INVENTION

The present invention relates to quick-crystallizing polyester compositions.

More particularly, the invention relates to quickcrystallizing polyester compositions in which the polyester mainly consists of polyethyleneterephthalate (PET).

PET is used in great amounts, particularly in the fields of films and fibers, while its commercial development as a material for injection molding has slackened off due to the long cycle times necessary to obtain dimensionally stable articles.

The compositions utilized for said injection molding do not actually reach high degrees of crystallinity—the molding times being equal—in comparison with other plastic materials.

Therefore, a premature drawing of a not-sufficiently-crytallized shaped article may result in further crystallization in the course of the time, with consequent changes in the volume of the article itself.

However, the rate of crystallization of PET can be increased, which means that the crystallization temperature of the melt can be raised by incorporating proper nucleating agents into the molding composition.

Nucleating agents for the PET crystallization are per se well known in the art.

For example, European patent application No. 31201 describes the preparation of PET by reaction of terephthalic acid and ethylene glycol in the presence of sodium hydroxide, with formation "in situ" of the nucleating agent.

European patent application No. 21648 describes the reaction of PET with a nucleating agent selected from the ionizable metal salts of an organic compound having at least an acid proton. Examples of such salts are the sodium salts of substituted benzoic acids which contain at least one substituent of the nitro, halogen, hydroxyl, phenyl, or oxyphenyl type.

European patent application No. 25573 describes the nucleation of PET with a polyoxyalkylene containing at least one —COOM group.

U.S. Pat. No. 3,761,450 describes lithium and/or sodium salts of aliphatic, cycloaliphatic, aromatic carboxylic acids, or heterocyclic polycarboxylic acids, containing up to 20 carbon atoms, as nucleating agent for PET.

G.B. Pat No. 2,015,014 described sodium and potassium salts of selected organic polymers, containing pendent carboxylic groups, as agents capable of increasing the crystallization rate of PET in the composite materials.

U.S. Pat. No. 3,516,957 describes, as nucleating agents for PET, salts of alkali and alkaline-earth metals of organic acids having from 10 to 25 carbon atoms, such as for example sodium stearate.

Japanese Patent Publication No. 71/29977 describes sodium benzoate as a nucleating agent for PET.

U.S. Pat. No. 4,212,791 describes compositions comprising PET, an inert inorganic nucleating agent, a crystallization promoter (polyester oligomer which does not contain carboxylates), and a copolyester-ether thermoplastic segmented elastomer.

Europeans patent application No. 102,768 describes a method of nucleating PET by using a nucleating agent comprising an alkaline salt of a polyethyleneterephthalate oligomer. The nucleating agent is first formed and then brought into contact with the PET to be nucleated.

From on examination of this prior art it is apparent, however, that nucleating agents which cause an appreciable increase in the crystallization rates lead to undesirable molecular weight reduction, while nucleating agents which do not lead to detrimental effects in this regard have little effect on the behavior of PET during crystallization.

It has now been discovered, and this is the object of the present invention, that the above-said drawbacks may be overcome by quick-crystallizing polyester compositions comprising a mixture consisting or consisting essentially of a polyester thermoplastic resin and a preformed nucleating agent selected from the class consisting of polymeric-base salts, or mixtures of salts, of alkali or alkaline-earth metals of the formula:

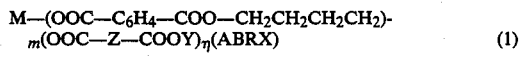

$$M-(OOC-C_6H_4-COO-CH_2CH_2CH_2CH_2)\text{-}_m(OOC-Z-COOY)_n(ABRX) \qquad (1)$$

wherein:
M = is an alkali metal or an alkaline-earth metal;
Y = is a group selected from: $CH_2CH_2-$, $-(CH_2)_4-$ and $-CH_2CH_2OCH_2CH_2-$;
Z = is a group $-C_6H_4-$, or a group $-(CH_2)_q-$, q being an integer from 7 to 10;
A = is an anion selected from the group consisting of carboxylate, sulphonate, sulphinate, phosphonate, phosphinate;
B = is a direct bond or a group selected from the class consisting of $-CH=CH-$, $-CH_2-$ and $-CH_2CH_2$;
R = is an arylene radical containing from 1 to 3 aromatic rings directly linked with one another, or condensed or bound by means of one of the following difunctional groups: $-O-$, $-CO-$, $-O-CH_2-CH_2-O-$, $-SO_2-$, $-NH-$, $-C(CH_3)_2-$, os R is a thiophene or furane ring, and, when A is a carboxylate and B is a direct bond, R may carry as a substituent at least one nitro, halogen, phenyl, or oxyphenyl group;
X = is a hydrogen atom or, when A is a carboxylate, B is direct bond and R a substituted or unsubstituted phenyl ring, X is a $-COOM$ group or a $-COO(CH_2)_4OH$ group;
m = is an integer from 5 to 20; and
n = is 0 or an integer from 1 to 5
said compositions being devoid of monomeric alkali or alkaline-earth terephthalates.

Any thermoplastic polyester resin is utilizable for preparing the composition of the present invention, although polyethyleneterephthalate is the preferred resin.

Analogously, any alkali or alkaline-earth metal can be used for preparing the nucleating agent of the formula (1), although sodium is the preferred alkali metal.

The polymeric-base nucleating salt of formula (1) utilized for preparing the composition according to the present invention has a content of alkali metal or of alkaline-earth metal ranging from 0.09 to 33% by weight, depending on the nature of M, and on the value of m and of n.

The alkali metal content may be practically varied as a function of the crystallization temperature to be reached and of the molecular weight value to be maintained for the product.

When the metal is sodium, the content of such metal in the nucleating agent of formula (1) is higher than about 0.4% by weight.

The molecular weight and the chemicophisical properties, as well as the viscosity of the nucleating agent utilized in the preparation of the composition of the present invention, are controlled to a great extent by the amount of alkali metal or of the alkaline-earth metal, and vary in the inverse ratio of its concentration.

Generally, however, the nucleating agent of formula (1) has an inherent viscosity ($\eta$), in phenol/tetrachloroethane (60/40) at 30° C., higher than 0.1 dl/g and an average number molecular weight higher than 1,000.

The nucleating agent of formula (1) is prepared separately and is admixed with the thermoplastic polyester resin in the molten state in amounts ranging from 0.1 to 10% by weight, preferably from 0.2 to 4% by weight, in order to have an amount of alkali metal or of alkaline-earth metal in the final composition of the nucleated polyester higher than about 300 ppm.

The quick-crystallizing polyester compositions of the present invention are characterized by high crystallization temperatures, high crystallization rates, a small reduction of the molecular weight, a homogeneous distribution, and a low concentration of the nucleating agent; moreover they may be additioned with inert fillers, such as fibers of glass, carbon, boron, etc., and/or with inorganic particles of glass, mica, zeolites, graphite, talc, etc.

The nucleating agent of formula (1) is prepared by intimately mixing the polymeric base in the form of a fine powder with a salt of formula

  (2)

in an amount from 5 to 20% by weight referred to the total, and by extruding the resulting mixture at a temperature higher than 250° C.

The product, after having undergone a washing in boiling water to remove the residues of unreacted salt, is then ready for the final use.

Examples of salts which are useful for preparing the nucleating agent of formula (1) are: sodium orthochlorobenzoate, sodium salicylate, sodium orthonitrobenzoate, sodium phehyl acetate, sodium ortho-, meta-, para-chlorophenyl acetate, sodium ortho-, meta-, para-hydroxyphenyl acetate, sodium 2-chloronaphthoate, sodium nicotinate, etc. The preferred salts are sodium orthochlorobenzoate and sodium salicylate.

According to another method of preparation, the nucleating agent of formula (1) may be obtained by dissolving the polymeric base in a proper solvent, for example m-cresol, in order to provide solutions at concentrations not higher than 10%. To these solutions there is then added an aqueous solution at 30% by weight of a hydroxide of an alkali or alkaline-earth metal, preferably sodium hydroxide, in an amount up to basicity (phenolphthalein).

The reaction product is precipitated, for example, with methanol, washed, dried, and is then ready for the final application.

The polymeric base of the nucleating agent of formula (1) is prepared according to conventional polycondensation processes by reaction of terephthalic acid, or esters thereof, optionally in admixture with acids of formula $HCOO-(CH_2)_q-COOH$, where q is the same as defined hereinbefore, with butylene glycol either alone or in admixture with diols such as $HOCH_2CH_2OH$, and $HOCH_2CH_2OCH_2OH$.

For a still better understanding of the present invention, a few illustrative examples are given hereunder, which are not to be construed, however, as a limitation of the invention.

A few methods of preparing the nucleating agent which is utilized for the preparation of the compositions of this invention are described as well.

The effectiveness of the nucleating agent was evaluated on the basis of the temperature of the crystallization peak of polyester resin/nucleating agent mixtures during the cooling of the melt, by means of differential thermal analysis.

The inherent viscosity, $\eta$, is equal to 0.25 dl/g in 60:40 phenol:tetrachloroethane at 30° C. The average number molecular weight Mn, and the average weight molecular weight Mw, were calculated from GPC (gel permeation chromatography), using m-cresol as a solvent, at 100° C. The sodium content was determined by atomic absorption.

PREPARATION A 90 g of granules of polybutyleneterephthalate (PBT) ($\eta = 0.8$ dl/g in 60:40 phenol:tetrachloroethane at 30° C.) and 10 g of sodium orthochlorobenzoate (fine powder) were blended in a mixer.

The blend was then extruded in a ¾ inch extruder, type HAAK RHEOCORD EC, at 280° C.

The thus-obtained sample had an inherent viscosity $\eta = 0.26$ dl/g. The product was washed in boiling water for 48 hours in order to remove the residue of unreacted sodium salt.

The final sodium content was evaluated by means of atomic absorption; it was about 0.75%. The crystallization peak temperature was obtained from the cooling curve of the melt by a differential calorimeter, Perkin Elmer DSC 7, employing a cooling rate of 10° C./minute. The crystallization peak temperature was equal to 198° C. against a temperature of 175° C. for the starting PBT.

PREPARATION B

A sample of amorphous PBT ($\eta = 0.8$ dl/g) was dissolved in m-cresol to obtain a 3% solution. The sample was neutralized by adding an aqueous solution of sodium hydroxide at 30% at 30° C. up to basicity (phenolphthalein).

The product was precipitated with methanol, filtered, washed with methanol, and dried.

It exhibited an inherent viscosity $\eta = 0.17$ dl/g and a sodium concentration equal to 0.55%.

The crystallization peak temperature was about 200° C.

PREPARATION C

The procedures of Preparation A were followed, with the exception that the sodium orthochlorobenzoate was replaced by sodium salicylate. The inherent viscosity of the thus-prepared nucleating agent was equal to 0.45 dl/g, and the sodium content, measured by atomic absorption, was 0.72%; the crystallization peak temperature was 195° C.

EXAMPLE 1

The nucleating agent obtained from Preparation A was ground until a fine powder was obtained, then it was blended in different percentages with PET ($\eta=0.78$). The various blends thus obtained were dried at 120° C. for 12 hours, and then they were extruded at 280° C.

The thus-obtained results are reported hereinafter:

| % nucl. | % Na | Tc(°C.) | DHc(j/g) | $\eta$(dl/g) | Mn | Mw |
|---|---|---|---|---|---|---|
| 0 | 0 | 185 | −40 | 0.77 | 16000 | 47000 |
| 1 | 0.006 | 200.4 | −40 | 0.77 | 15600 | 48850 |
| 2 | 0.012 | 202.2 | −41 | 0.76 | 14200 | 44900 |
| 4 | 0.024 | 208.7 | −41 | 0.73 | 13750 | 42200 |
| 6 | 0.036 | 210.3 | −43 | 0.68 | 14000 | 40600 |

From these data it is apparent that it is possible to nucleate PET without causing appreciable changes in the molecular weight.

EXAMPLE 2

Using the nucleated PETs of Example 1, some 3 mm-thick plates were prepared by compression molding. These plates were obtained by causing the various polymers to melt at 280° C. for 3 minutes without pressure and for 2 minutes under a pressure of 60 atm.

The resulting plates were cooled at a rate of 50° C./minute, made molten again at 280° C. for 5 minutes, and then transferred into a press, where they remained for 30 seconds and for 60 seconds at 160° C.

The crystallinity values, determined by IR and viscosity measurements, are indicated hereinafter.

| % nucl | residence time in mold (sec) | Cryst. (%) | $\eta$(dl/g) |
|---|---|---|---|
| 0 | 30 | 2 | 0.65 |
|   | 60 | 20 | 0.65 |
| 1 | 30 | 23 | 0.67 |
|   | 60 | 30 | 0.67 |
| 2 | 30 | 26.6 | 0.67 |
|   | 60 | 30.5 | 0.67 |
| 4 | 30 | 30 | 0.65 |
|   | 60 | 30 | 0.65 |
| 6 | 30 | 30 | 0.65 |
|   | 60 | 30 | 0.65 |

EXAMPLE 3

Tests of the same type as indicated above in Example 1 were carried out using the nucleating agent prepared under item C. The thus-obtained results are reported below:

| % nucl. | % Na | Tc (°C.) | $\eta$(dl/g) |
|---|---|---|---|
| 0 | 0 | 185 | 0.73 |
| 2 | 0.014 | 200 | 0.73 |
| 4 | 0.028 | 202 | 0.71 |

EXAMPLE 4

Example 1 was repeated using the nucleant prepared under item B. The thus-obtained results are reported hereinafter.

| % nucl. | % Na | Tc (°C.) | $\eta$(dl/g) |
|---|---|---|---|
| 0 | 0 | 185 | 0.73 |
| 3 | 0.017 | 204 | 0.71 |
| 5 | 0.028 | 206 | 0.70 |

EXAMPLE 5

Using a PET nucleated with 4% of the nucleant of preparation A, composite plates containing 30% of long glass fibers were produced according to the process described in Italian patent application No. 19610 A/86. These plates exhibited an inherent viscosity of 0.73 dl/g.

After having heated the plates in an IR furnace at 290° C. and having transferred the melt into a mold at 160° C., finished parts were molded from such plates by means of blow molding. The pressure utilized was 150 kg/cm$^2$.

After a residence time in the mold of about 30 seconds, the crystallinity percentage of the PET was about 30%.

What is claimed is:

1. Quick-crystallizing polyester compositions comprising a mixture consisting essentially of a polyester thermoplastic resin and a preformed nucleating agent selected from the class consisting of polymeric-base salts, or mixtures of salts, of alkali or alkaline-earth metals of the formula:

$$M-(OOC-C_6H_4-COO-CH_2CH_2CH_2CH_2)\text{-}_m(OOC-Z-COOY)_n(ABRX) \quad (1)$$

wherein

M is an alkali or an alkaline-earth metal;
Y is a group selected from: $-CH_2CH_2-$, $-(CH_2)_4-$ or $-CH_2CH_2OCH_2CH_2-$;
Z is a group $-C_6H_4-$, or a group $-(CH_2)_q-$, q being an integer from 7 to 10;
A is an anion selected from the group consisting of carboxylate, sulphonate, sulphinate, phosphonate and phosphinate;
B is a direct bond or a group selected from the class consisting of $-CH=CH-$, $-CH_2-$ and $-CH_2CH_2-$;
R is an arylene radical containing from 1 to 3 aromatic rings directly linked with one another or condensed or bound by means of one of the following difunctional groups; $-O-$, $-CO-$, $-OCH_2CH_2O-$, $-SO_2-$, $-NH-$, $-C(CH_3)_2-$, or R is a thiophene or furane ring and, when A is a carboxylate and B is a direct bond, R may carry as a substituent at least one nitro, halogen, phenyl or oxyphenyl group;
X is a hydrogen atom or, when A is a carboxylate, B is a direct bond and R a substituted or unsubstituted phenyl ring, X is a $-COOM$ group or a $-COO(CH_2)_4OH$ group;
m is an integer from 5 to 20; and
n is 0 or an integer from 1 to 5 said compositions being devoid of monomeric alkali or alkaline-earth terephthalates.

2. Compositions according to claim 1, wherein the polyester thermoplastic resin is polyethyleneterephthalate.

3. Compositions according to claim 1 or 2, wherein the nucleating agent is added in amounts ranging from 0.1 to 10% by weight.

4. Compositions according to claim 1 or 2, wherein the nucleating agent is added in amounts ranging from 0.2 to 4% by weight.

5. Compositions according to claim 1 or 2, wherein the nucleating agent of formula (1) has an alkali metal content or an alkaline-earth metal content ranging from 0.09 to 33% by weight.

6. Compositions according to claim 1 or 2, wherein the alkali metal is sodium.

7. Compositions according to claim 6, wherein the content of sodium in the nucleating agent of formula (1) is higher than 0.4% by weight.

8. Compositions according to claim 1 or 2, wherein inert fillers selected from glass, carbon or boron fibers and inorganic particles of glass, mica, zeolites, graphite are talc are also included.

9. A quick-crystallizing polyester composition as defined in claim 1, wherein the nucleating agent has an inherent viscosity in phenol/tetrachloroethane (60/40) at 30° C. higher than 0.1 dl/g and an average number molecular weight higher than 1,000.

* * * * *